W. J. BARKER.
UNIVERSAL JOINT.
APPLICATION FILED JAN. 31, 1916. RENEWED MAR. 28, 1917.

1,228,166.

Patented May 29, 1917.
2 SHEETS—SHEET 1.

Inventor
William J. Barker

By Whittemore Hulbert & Whittemore
Attorneys

W. J. BARKER.
UNIVERSAL JOINT.
APPLICATION FILED JAN. 31, 1916. RENEWED MAR. 28, 1917.

1,228,166.

Patented May 29, 1917.
2 SHEETS—SHEET 2.

Inventor
William J. Barker

By Whittemore Hulbert Whittemore
Attorneys

UNITED STATES PATENT OFFICE.

WILLIAM J. BARKER, OF FLINT, MICHIGAN.

UNIVERSAL JOINT.

1,228,166.  Specification of Letters Patent.  Patented May 29, 1917.

Application filed January 31, 1916, Serial No. 75,433. Renewed March 28, 1917. Serial No. 158,120.

*To all whom it may concern:*

Be it known that I, WILLIAM J. BARKER, a citizen of the United States of America, residing at Flint, in the county of Genesee and State of Michigan, have invented certain new and useful Improvements in Universal Joints, of which the following is a specification, reference being had therein to the accompanying drawings.

The invention relates to universal joints more particularly designed for use in transmission shafts of motor vehicles, and the invention comprises the novel construction as hereinafter set forth.

Figure 1:
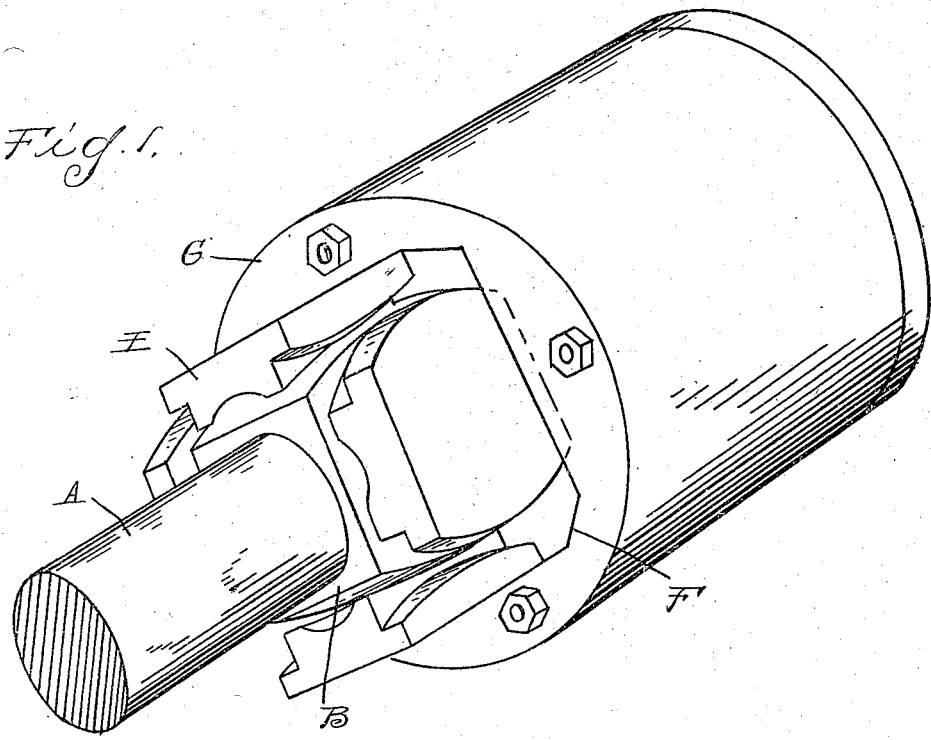
Figure 1 is a perspective view of the joint showing the members thereof partly engaged.
Figure 4:
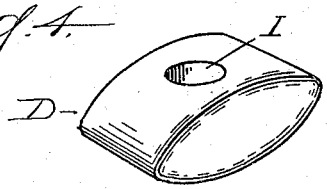
Fig. 4 is a perspective view of one of the adjustable bearing members detached.
Figure 3:
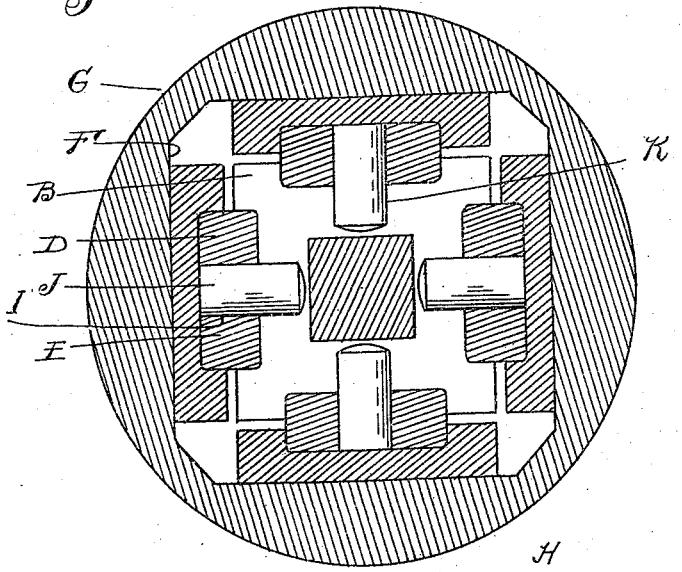
Fig. 3 is a transverse section thereof.
Figure 2:
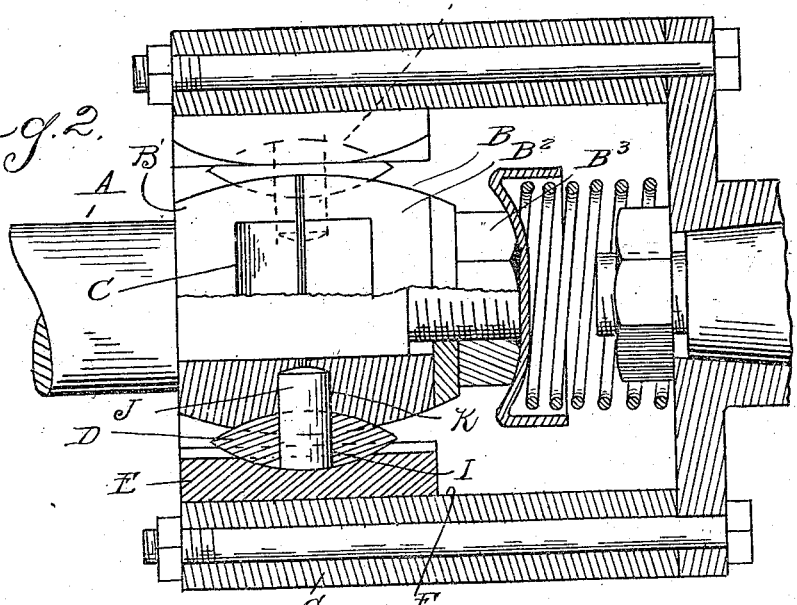
Fig. 2 is a vertical longitudinal section through the joint.

A is the male member, which is provided with a head B polygonal in cross-section and arc-shaped in longitudinal section. The several faces of this head are provided with concave recesses C which are also arc-shaped to receive adjustable bearing blocks D of a similar curve. E are bearing blocks which have concave recesses on their inner faces of a similar curve to the recesses C to receive the blocks D. The outer faces of these blocks E are flat and slidably engage the flat faces F of a polygonal recess in the female member G. The radius of the arc of the member D and the corresponding faces of the recesses is such as to be concentric with the axis of the shaft, as indicated at H Fig. 2. Each of the blocks D is centrally apertured at I for the reception of a pin J which extends beyond the block and into a recess K in the head B. The pin J is slidable in the aperture I so as to permit of reversing the block D.

With the construction as described when the parts are assembled universal movement of the member A is permitted with the member G by the sliding of the arc-shaped blocks D in the recesses within the members E. There is also a slight lateral movement permitted which distributes the stresses and the wear on the parts. The blocks D form, however, a rigid coupling for transmitting torque. As the sliding movement is between the outer face of the block D and the contacting face of the recess in the block E these surfaces will be subjected to the greatest wear. A greater length of life can be obtained by reversing the blocks D, which can be done at any time by merely sliding the pin J in the recess I so that the inner face may be placed outside. The blocks E are also easily renewed and thus the life of the member can be indefinitely extended by the occasional renewal of these parts.

Another important feature disclosed is the construction of the male member whereby the same may be adjusted to compensate for wear upon the parts. As shown, the head B of the male member A comprises, two sections B' and B² adjustable longitudinally of the axis of the male member A. Between the sections B' and B² are located shims separating the same and at the end of the member A is the nut B³ for securing the sections.

What I claim as my invention is:—

1. A universal joint, comprising a male member having a polygonal head with recesses in the faces thereof, a female member having faces corresponding to those of the male member, bearing blocks adjacent to the faces of said head for engagement with the corresponding faces of the female member, and blocks intermediate said bearing blocks and male member having arc-shaped faces in longitudinal section and being substantially angular in cross-section.

2. A universal joint, comprising male and female members having corresponding polygonal faces, bearing blocks intermediate the corresponding faces, and intermediate blocks arc-shaped in longitudinal section and substantially rectangular in cross-section, said intermediate blocks engaging corresponding recesses in said male member and bearing block.

3. A universal joint, comprising male and female members having corresponding polygonal faces, bearing blocks between the corresponding faces of said members, and reversible blocks intermediate said bearing blocks and one of said members having faces arc-shaped in longitudinal section and concentric with the point of intersection of the axes of the joint members.

4. A universal joint, comprising male and female members having corresponding polygonal faces, bearing blocks between the corresponding faces of said members, said blocks having flat outer faces for engaging the faces of the female member, and the opposite faces of said blocks and the male member being arc-shaped to permit of relative movement, and members intermediate said bearing blocks and male member arc-shaped in longitudinal section and engaging corresponding recesses in said male member and blocks.

5. In a universal joint, the combination with male and female members having opposed faces, of a bearing block intermediate said faces and a reversible non-rotatable intermediate block arc-shaped in longitudinal section engaging corresponding recesses in the bearing block and male member.

6. In a universal joint, the combination with male and female members, one of said members being recessed, of a reversible non-rotatable block intermediate said members and engaging the recess.

7. In a universal joint, the combination with male and female members, of a reversible non-rotatable block having similar outer and inner faces arc-shaped in longitudinal section, and a second block engaging said reversible non-rotatable block, both of said blocks being intermediate said male and female members.

8. In a universal joint, the combination with male and female members, of a reversible block intermediate said members having similar outer and inner faces arc-shaped in longitudinal section, means for securing said block in fixed relation to one of said members, and a member upon said female member engaging said block, permitting of relative movement of said block and female member.

9. In a universal joint, the combination with male and female members, of a reversible block intermediate said members having similar inner and outer faces arc-shaped in longitudinal section, the inner face engaging a corresponding recess in said male member, and means for detachably securing said block in fixed relation to said male member.

10. In a universal joint, the combination with male and female members, of a reversible block intermediate said members having similar inner and outer faces arc-shaped in longitudinal section and having an aperture centrally therethrough, a pin engaging said aperture and of greater length than the thickness of said block, a projecting portion of the pin engaging a corresponding aperture in said male member, and the latter being provided with a recess for receiving the inner face of said block.

11. In a universal joint, the combination with male and female members, of a block intermediate said members having similar inner and outer faces arc-shaped in longitudinal section and being substantially angular in cross section, and means for adjusting one of said members to compensate for wear.

12. In a universal joint, the combination with male and female members of a reversible non-rotatable block intermediate said members, and means for adjusting one of members to compensate for wear.

13. In a universal joint, the combination with a female member having a plurality of inner faces and a male member having a plurality of arc-shaped faces having axes transverse to the axis of the male member and passing therethrough, of bearing blocks between the inner faces of said female member and the arc-shaped faces of said male member, said bearing blocks having inner faces corresponding substantially to the arc-shape of said male member, and means for adjusting one of said members to compensate for wear.

In testimony whereof I affix my signature in presence of two witnesses.

WILLIAM J. BARKER.

Witnesses:
AMY R. BRACKSTONE,
ALBERT G. GRIGGS.

Copies of this patent may be obtained for five cents each, by addressing the "Commissioner of Patents, Washington, D. C."